US006804871B1

(12) United States Patent
Smith

(10) Patent No.: US 6,804,871 B1
(45) Date of Patent: Oct. 19, 2004

(54) METHOD FOR ALIGNING CLUTCH ASSEMBLY

(76) Inventor: Leward Nile Smith, Rte. 11, Box 3650, Lake City, FL (US) 32024-9358

( * ) Notice: Subject to any disclaimer, the term of this patent is extended or adjusted under 35 U.S.C. 154(b) by 26 days.

(21) Appl. No.: 10/426,310

(22) Filed: Apr. 30, 2003

Related U.S. Application Data

(60) Provisional application No. 60/377,718, filed on May 3, 2002.

(51) Int. Cl.[7] .................................................. B23Q 3/00

(52) U.S. Cl. ............................. 29/464; 29/239; 29/446; 56/12.7; 56/15.3

(58) Field of Search .......................... 29/464, 446, 428, 29/434, 239, 244, 893.2, 888.09; 56/12.7, 15.3, 122, 156, DIG. 4; 83/109, 120, 122, 199, 240, 527; 241/117, 123

(56) References Cited

U.S. PATENT DOCUMENTS

| | | | | |
|---|---|---|---|---|
| 190,675 | A | 5/1877 | Gaines | |
| 589,236 | A | 8/1897 | Williams | |
| 604,283 | A | 5/1898 | Albrecht | |
| 662,421 | A * | 11/1900 | Krippelz et al. | 191/17 |
| 787,290 | A | 4/1905 | Griffin | |
| 1,266,894 | A | 5/1918 | Williams | |
| 1,559,924 | A | 11/1925 | Willcox | |
| 1,713,507 | A | 5/1929 | Ammon | |
| 1,752,290 | A | 4/1930 | Ammon | |
| 1,761,083 | A | 6/1930 | Liggett | |
| 1,860,519 | A | 5/1932 | Wickersham | |
| 1,889,129 | A | 11/1932 | Nielsen | |
| 2,026,790 | A | 1/1936 | Mankoff | 83/11 |
| 2,128,194 | A | 8/1938 | Sheldon et al. | 83/11 |
| 2,244,577 | A | 6/1941 | Schreiber | 83/11 |
| 2,318,219 | A | 5/1943 | Harris | 83/11 |
| 2,392,958 | A | 1/1946 | Tice | 241/55 |
| 2,663,505 | A | 12/1953 | Sennholtz | 241/197 |
| 2,705,596 | A | 4/1955 | Poyser | |
| 2,710,635 | A | 6/1955 | Alexander | 144/162 |
| 2,863,476 | A | 12/1958 | Clark | 144/172 |
| 2,864,420 | A | 12/1958 | Schmidt | 146/106 |
| 2,900,069 | A | 8/1959 | Manns et al. | |
| 3,035,682 | A | 5/1962 | Ferch | |

(List continued on next page.)

OTHER PUBLICATIONS

Wood Waste Disposal Problems: Bandit Has Some Answers!, Bandit Industries, Inc. Hard Hat News, Oct. 22, 1993.

The Beast, Model 30 Grinding Yard Waste, Model 15, Grinding Housing Demolition, Waste Handling Equipment News, Sep. 1994.

Bandit's Beast Maintains Nature's Beauty, Construction Equipment Guide, Jun. 1, 1994.

(List continued on next page.)

*Primary Examiner*—David P. Bryant
*Assistant Examiner*—Stephen Kenny
(74) *Attorney, Agent, or Firm*—Bliss McGlynn, P.C.

(57) ABSTRACT

A method for aligning a clutch assembly having a clutch shaft and a housing with a plurality of threaded first fasteners. The method includes the steps of attaching the clutch assembly to a driveshaft of an engine mounted on a support frame having a plurality of second threaded fasteners. The method includes the steps of mounting a support plate to the housing and support frame and extending the first fasteners and second fasteners through mounting holes. The method also includes the steps of deflecting the clutch shaft relative to the driveshaft and disposing spacers over the first fasteners and second fasteners adjacent the support plate. The method includes the steps of engaging the first fasteners and second fasteners with third fasteners to seat the spacers against the support plate and fixedly securing the spacers to the support plate. The method further includes the steps of assembling and tensioning a drive belt assembly operatively cooperating with the clutch shaft such that the deflection created is negated and the clutch shaft is brought into alignment with the driveshaft of the engine.

20 Claims, 6 Drawing Sheets

U.S. PATENT DOCUMENTS

| | | | | | |
|---|---|---|---|---|---|
| 3,194,543 | A | | 7/1965 | McIlvaine | |
| 3,203,532 | A | | 8/1965 | Mimnaugh et al. | |
| 3,254,687 | A | | 6/1966 | Tertyshnikov | 146/79 |
| 3,367,585 | A | | 2/1968 | Ratkowski | 241/197 |
| 3,436,028 | A | | 4/1969 | Koehnen et al. | 241/186 |
| 3,509,924 | A | | 5/1970 | Newhouse, Jr. | 146/70.1 |
| 3,642,214 | A | | 2/1972 | Blackwell, Jr. | 241/191 |
| 3,844,494 | A | | 10/1974 | Hightower | 241/197 |
| 3,907,016 | A | | 9/1975 | Nicholson et al. | 144/172 |
| 4,000,859 | A | | 1/1977 | Whitney | |
| 4,060,961 | A | | 12/1977 | Anderson et al. | |
| 4,074,594 | A | | 2/1978 | Dall et al. | 76/101 |
| 4,076,177 | A | | 2/1978 | Hirayama et al. | |
| 4,077,450 | A | | 3/1978 | Ackerman | 144/172 |
| 4,077,573 | A | | 3/1978 | Kersey et al. | |
| 4,117,985 | A | | 10/1978 | Lazareck | 241/197 |
| 4,129,260 | A | | 12/1978 | Baker | 241/46 |
| 4,129,262 | A | | 12/1978 | Lowry | |
| 4,146,184 | A | | 3/1979 | Whitney | |
| 4,146,185 | A | | 3/1979 | Schober | |
| 4,162,769 | A | | 7/1979 | Lapointe | 241/68 |
| 4,162,770 | A | | 7/1979 | Lewis | |
| 4,168,035 | A | | 9/1979 | Palm et al. | 241/81 |
| 4,344,581 | A | | 8/1982 | Redemann | |
| 4,504,019 | A | | 3/1985 | Newell et al. | |
| 4,558,826 | A | | 12/1985 | Martinek | |
| 4,573,643 | A | | 3/1986 | Orphall et al. | |
| 4,688,731 | A | | 8/1987 | Hunt et al. | |
| 4,702,424 | A | | 10/1987 | Widlak | 241/101.7 |
| 4,717,083 | A | | 1/1988 | Quast et al. | 241/197 |
| 4,848,681 | A | | 7/1989 | Eriksson et al. | |
| 4,850,406 | A | | 7/1989 | Krautzberger | 144/230 |
| 4,872,500 | A | | 10/1989 | Duffey et al. | 164/34 |
| 4,915,310 | A | | 4/1990 | Stelk | 241/197 |
| 4,917,314 | A | | 4/1990 | Manschwetus | 241/194 |
| 4,922,977 | A | | 5/1990 | Colton et al. | 144/230 |
| 4,967,969 | A | | 11/1990 | Griffith, III | 241/93 |
| 4,982,904 | A | | 1/1991 | Greiner | 241/73 |
| 5,002,233 | A | | 3/1991 | Williams | |
| 5,042,727 | A | | 8/1991 | Plante | 241/101.7 |
| 5,044,567 | A | | 9/1991 | Hausler et al. | 241/73 |
| 5,078,328 | A | | 1/1992 | Willingham | |
| 5,114,085 | A | | 5/1992 | Inui | 241/195 |
| 5,205,496 | A | | 4/1993 | O'Donnell et al. | 241/34 |
| 5,209,278 | A | | 5/1993 | Carpenter et al. | 144/230 |
| 5,285,974 | A | | 2/1994 | Cesarini | |
| 5,295,291 | A | * | 3/1994 | Harris | 29/274 |
| 5,372,316 | A | | 12/1994 | Bateman | |
| 5,377,919 | A | | 1/1995 | Rogers et al. | |
| 5,392,999 | A | | 2/1995 | Konig et al. | |
| 5,404,993 | A | | 4/1995 | Scarrow | |
| 5,413,286 | A | | 5/1995 | Bateman | 241/190 |
| 5,435,689 | A | | 7/1995 | Stonehouse | |
| 5,474,239 | A | | 12/1995 | Williams, Jr. et al. | |
| 5,507,441 | A | | 4/1996 | De Boef et al. | |
| 5,526,988 | A | | 6/1996 | Rine | |
| 5,529,249 | A | | 6/1996 | Braun et al. | |
| 5,611,496 | A | | 3/1997 | Fleenor | |
| 5,713,525 | A | | 2/1998 | Morey | |
| 5,743,314 | A | | 4/1998 | Puch | |
| 5,806,161 | A | * | 9/1998 | Schneider | 29/271 |
| 5,863,003 | A | | 1/1999 | Smith | |
| 5,937,709 | A | * | 8/1999 | Crawford et al. | 74/606 R |
| 6,016,979 | A | | 1/2000 | Squires | |
| 6,047,912 | A | | 4/2000 | Smith | |
| 6,059,210 | A | | 5/2000 | Smith | |
| 6,299,082 | B1 | | 10/2001 | Smith | |
| 6,517,020 | B1 | | 2/2003 | Smith | |

OTHER PUBLICATIONS

Bandit Industries, Inc., Reader Card 218, Forest Publications, Timber West, Nov. 1993.
Bandit Industries' Model 15–H Beast Recycler, Forest Products Equipment, Aug. 1994.
The Model 15 Beast, Bandit Industries, Inc., MSW Management, Mar./Apr. 1994.
Want to Lower the Cost of Breaking Down Yard and Other Landfill Waste? . . . Try the Beast from Bandit, Resource Recycling, Nov. 1994.
Turn Your Green Waste Into Green Dollars, Bandit Industries, Inc., Sportsturf, 1994.
"Product Release" for the new Model 15–H Beast Recycler Offered by Bandit Industries, Waste Handling Equipment New, Jun. 1994.
For Your Chipping and Grinding Needs, Bandit Industries, Inc., Forest Products Equipment, Aug. 1994.
Megagrind by Rexworks 800, 1995.
How to chop yard waste costs!, 7000 Commercial Grinder, Farmhand.
The Beast, Model 15–H, Bandit Industries, Inc.
The Beast Recyclers from Bandit Industries . . . with Big Appetites for Waste, Bandit Industries.
The Beast—Coming in the Summer of 1993 from Bandit Industries, Inc., Bandit Industries, Inc.
Maxigrind by Rexworks, The Most Versatile Materials Processing Machine.
Industrial Grinder, Big Bite, Manufactured by Haybuster.

* cited by examiner

METHOD FOR ALIGNING CLUTCH ASSEMBLY

CROSS-REFERENCE TO RELATED APPLICATION(S)

The present invention claims the priority date of copending U.S. Provisional Patent Application Serial No. 60/377,718, filed May 3, 2002.

BACKGROUND OF THE INVENTION

1. Field of the Invention

The present invention relates generally to waste processing machines and, more particularly, to a method for aligning a clutch assembly of a waste processing machine.

2. Description of the Related Art

It is known to provide waste processing machines to reduce waste material. The waste processing machine typically includes an infeed system for directing the waste material to a waste reducing system for reducing the waste material. An example of such a waste processing machine is disclosed in U.S. Pat. No. 5,863,003, issued Jan. 26, 1999, to Smith, entitled "WASTE PROCESSING MACHINE", the disclosure of which is hereby incorporated by reference. In that patent, the infeed system includes an infeed conveyor to feed waste material such as wood to a rotor assembly of the waste reducing system. The rotor assembly of the waste reducing system is driven against the incoming waste material, which causes the incoming waste material to be reduced into particulate matter. The waste processing machine is controlled such that the resultant particulate matter is continually reduced until it reaches a predetermined size upon which it is discharged from the machine.

To drive the rotor assembly, the waste processing machine includes an engine having a power-take off assembly such as of a type supplied by Twin-Disk Incorporated of Racine, Wis. The power-take off assembly has a clutch assembly with a partially exposed clutch shaft, which serves as a driving member for rotating a sheave and belt of a belt drive assembly. The belt drive assembly uses a wide flat belt that is placed about the sheave on the power take-off assembly and about a corresponding sheave on the rotor assembly. In this manner, the rotor assembly of the waste processing machine is driven by the engine through the power take-off assembly, and belt drive assembly.

One concern is that the belt drive assembly places a large transverse load upon the sheave on the power-take off assembly when the belt is installed and tensioned. To respond to this concern, the manufacturers of these types of power take-off assemblies caution against the misalignment of the clutch assembly of the power take-off assembly, relative to a the engine, upon installation. More specifically, the clutch assembly includes a drive ring having teeth attached to a flywheel of the engine and a clutch plate having teeth is attached to a shaft of the clutch assembly. If the clutch plate teeth are misaligned with the teeth of the drive ring or the clutch shaft is not parallel with the crankshaft of the engine, damage to the teeth and clutch plate can occur.

Additionally, these manufacturers recommend the use of shims when assembling the power take-off assembly, in particular, a sheave housing of the power take-off assembly to an engine housing or engine bed frame. The shimming process is extremely time consuming and costly as the assembly is measured, then disassembled to allow the shims to be inserted, then reassembled, torqued-down, and then re-measured. This procedure is repeated until a zero alignment is achieved circumferentially around the sheave housing. When completed, the entire assembly is statically aligned, but this method of alignment does not fully correct for the transverse loading.

The above is not related to the load being placed upon the bearings of the power take-off assembly and sheave housing. In fact, the load is easily absorbed and sustained by the bearings within the power take-off assembly. However, the transverse loading of the belt drive assembly causes a deflection of the sheave housing of the power take-off assembly. This is undesired, as the transverse load upon the power take-off assembly by the belt drive assembly deflects the sheave housing and portions of the clutch assembly attached to the sheave housing of the power take-off assembly, but the portions of the clutch assembly that are attached to an engine flywheel remain oriented to the centerline of the engine. This disparity of alignment between the teeth of the clutch plate of the clutch assembly within the sheave housing of the power take-off assembly and those teeth of the drive ring disposed on the engine flywheel creates physical interference between these clutch components. This interference results in premature wear and failure of the clutch assembly.

To this point, the warnings of the power take-off manufacturers and their suggested shimming approaches during the initial assembly have failed to overcome the transverse loading effect when the belt drive assembly is installed and properly tensioned, even though this is the prescribed application for this type of power take-off assembly.

As a result, it is desirable to provide a method of aligning a clutch assembly for a waste processing machine to overcome a transverse loading effect of a belt drive assembly. It is further desirable to provide a method for aligning a clutch assembly of a power take-off assembly on a waste processing machine that is neither expensive nor time consuming. Therefore, there is a need in the art to provide a method that meets these desires.

SUMMARY OF THE INVENTION

It is, therefore, one object of the present invention to provide a method for aligning a clutch assembly.

It is another object of the present invention to provide a method for aligning a clutch assembly of a waste processing machine.

To achieve the foregoing objects, the present invention is a method for aligning a clutch assembly having a clutch shaft and a housing with a plurality of threaded first fasteners. The method includes the steps of attaching the clutch assembly to a driveshaft of an engine mounted on a support frame having a plurality of second threaded fasteners. The method includes the steps of mounting a support plate to the housing and support frame and extending the first fasteners and second fasteners through mounting holes. The method also includes the steps of deflecting the clutch shaft relative to the driveshaft and disposing spacers over the first fasteners and second fasteners adjacent the support plate. The method includes the steps of engaging the first fasteners and second fasteners with third fasteners to seat the spacers against the support plate and fixedly securing the spacers to the support plate. The method further includes the steps of assembling and tensioning a drive belt assembly operatively cooperating with the clutch shaft such that the deflection created is negated and the clutch shaft is brought into alignment with the driveshaft of the engine.

One advantage of the present invention is that a method is provided for aligning a clutch assembly. Another advantage of the present invention is that the method aligns a clutch assembly for a waste processing machine to overcome a transverse loading effect of a belt drive assembly. Yet another advantage of the present invention is that the method aligns a clutch assembly of a power take-off assembly on a waste processing machine that is neither expensive nor time consuming. Still another advantage of the present invention is that the method provides high precision seatability and allows easier serviceability of the clutch assembly. A further advantage of the present invention is that the method allows for zero manufacturing tolerance.

Other objects, features, and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
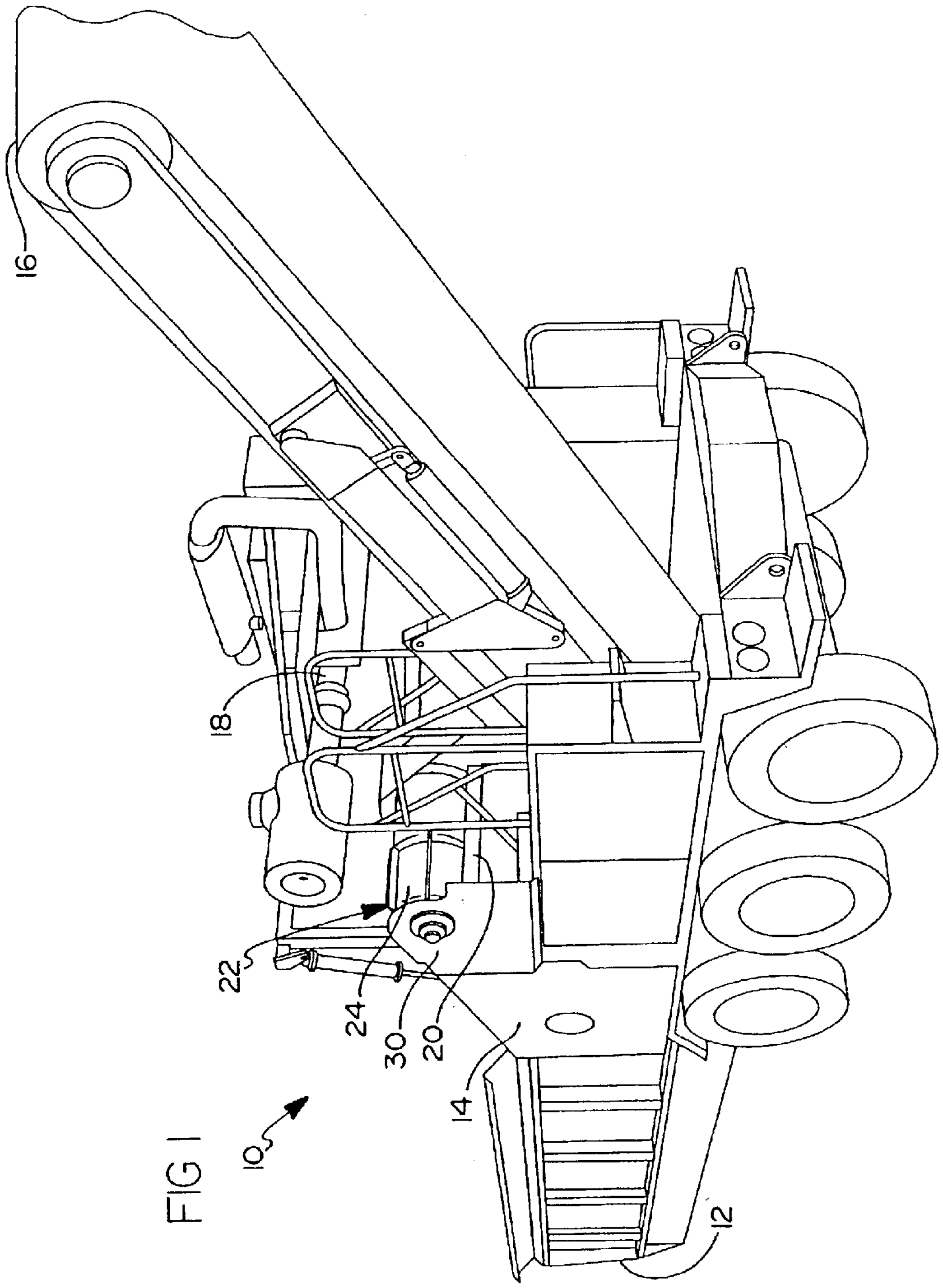
FIG. 1 is a perspective view of a waste processing machine.

Referring now to the drawings and in particular to FIG. 1, a waste processing machine 10 for reducing waste material is shown. The waste processing machine 10 includes an infeed system 12, a waste reducing system 14, and a discharge system 16. Waste material enters the waste processing machine 10 through the infeed system 12 where it is directed to the waste reducing system 14. The waste reducing system 14 reduces the waste material and directs it to the discharge system 16 where the reduced waste material is expelled from the waste processing machine 10.

Figure 2:
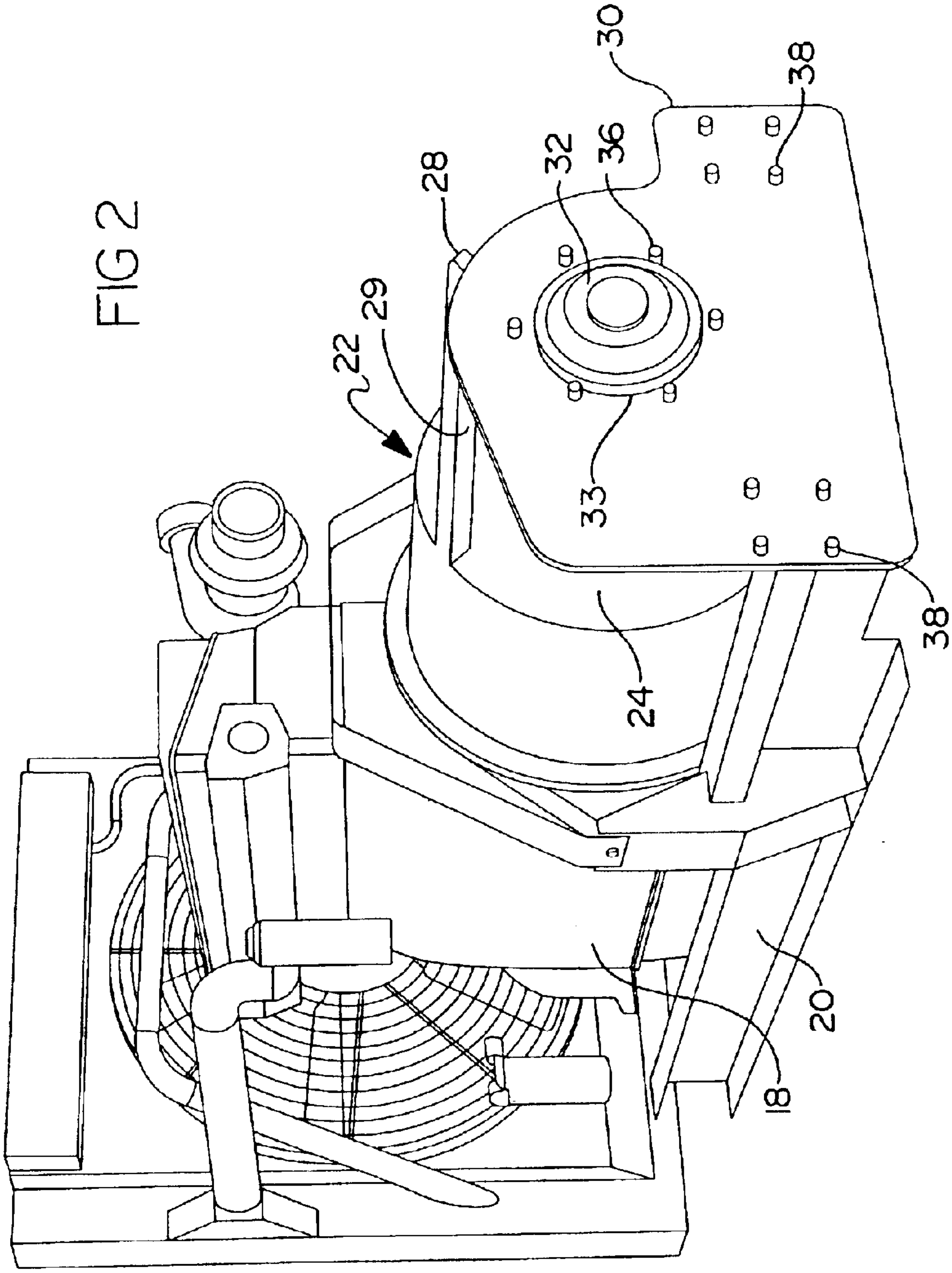
FIG. 2 is a perspective view of an engine and power take-off assembly of the waste processing machine of FIG. 1.

Referring to FIGS. 1 and 2, the waste processing machine 10 includes an engine 18 mounted on a support frame 20 and operatively connected to the waste reducing system 14. The waste processing machine 10 also includes a power take-off assembly, generally indicated at 22, operatively connected to the engine 18 to act as a power transfer device. The engine 18 also includes a flywheel (not shown) adapted to receive and retain a portion or drive ring (not shown) of a clutch assembly (not shown) of the power take-off assembly 22.

Referring to FIGS. 1 through 6B, the power take-off assembly 22 includes at least one clutch plate (not shown) attached to a clutch shaft 26. The clutch plate has a plurality of teeth that engage and disengage corresponding teeth on the drive ring. The clutch plate is enclosed by a clutch housing 24 disposed within a sheave housing 28 having an opening 29. The clutch shaft 26 is utilized as a drive shaft to rotate a sheave (not shown) disposed in the opening 29 about the clutch shaft 26 for a belt (not shown) of a belt drive assembly (not shown). The power take-off assembly 22 also includes a bearing 32 at one end of the clutch shaft 26. It should be appreciated that the clutch assembly is selectively engageable and disengageable to transfer or interrupt rotational energy from the engine 18 to the belt drive assembly through the power take-off assembly 22. It should also be appreciated that the alignment of the engageable members or drive ring and clutch plate of the clutch assembly, one portion or drive ring being attached to the engine flywheel and the other portion or clutch plate being attached to the clutch shaft 26 of the power take-off assembly 22 that is of concern. It should further be appreciated that the clutch assembly is conventional and known in the art.

The belt drive assembly includes a wide flat drive belt (not shown) that is disposed about the sheave on the clutch shaft 26 and routed over a corresponding sheave (not shown) on the rotor (not shown) of the waste reducing system 14 of the waste processing machine 10. It should be appreciated that the rotor of the waste processing machine 10 is driven by the engine 18, through the clutch assembly of the power take-off assembly 22, and the belt drive assembly. It should also be appreciated that the power take-off assembly 22, except for subsequent description, is conventional and known in the art.

The waste processing machine 10 includes a support plate 30 disposed on the end of the support frame 20 to receive and retain the outer end of the sheave housing 28 so that the sheave housing 28, the clutch shaft 26, and the bearing 32 are supported. The bearing 32 generally extends beyond the end of the sheave housing 28 and thus, a bearing opening 33 is cut through the support plate 30. The support plate 30 includes at least one, preferably a plurality of oversized mounting holes 36 for a function to be described. Beyond the attachment of the power take-off housing 24 to the engine 18, the physical support to maintain the alignment of the clutch assembly within the power take-off assembly 22 is provided by the rigidity of the support plate 30 as it is attached to the support frame 20 and the sheave housing 28. As discussed above, due to the transverse force placed on the clutch shaft 26 and all the associated support components by the belt drive assembly, if the engine 18 and power take-off assembly 22 are initially aligned and assembled statically, then the belt drive assembly will pull, or draw, the components out of line when the belt is tensioned.

Figure 3:
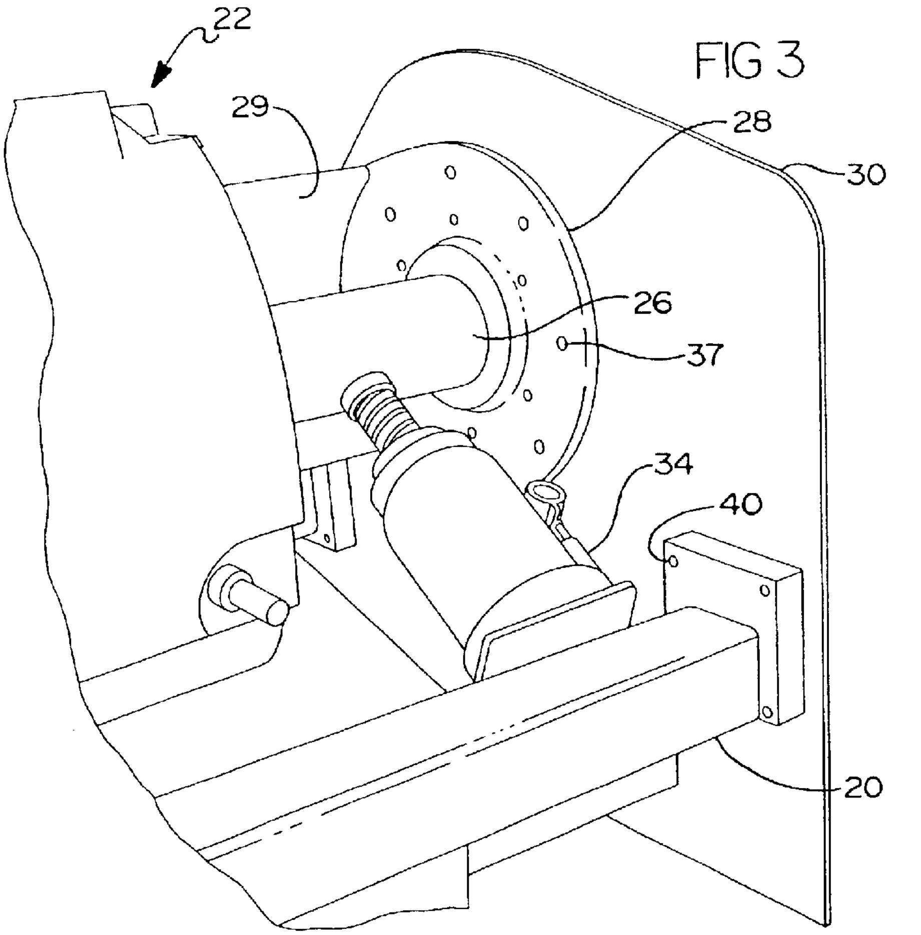
FIG. 3 is an enlarged perspective view of a portion of the power take-off assembly and engine of the waste processing machine of FIG. 2.
Figure 4:
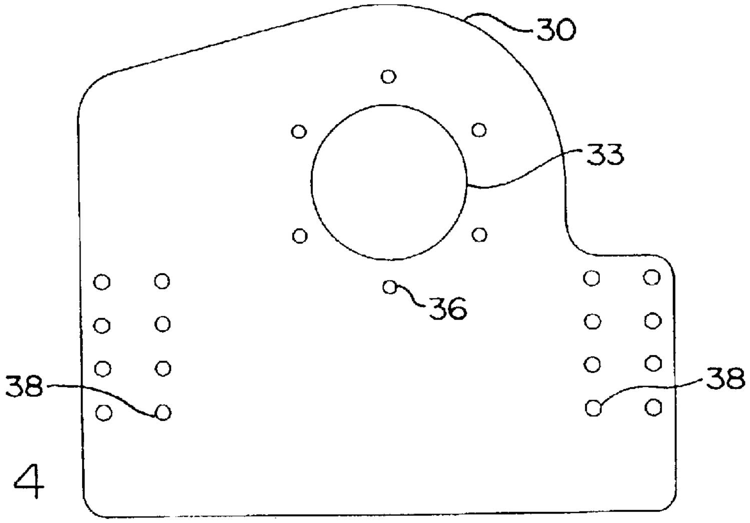
FIG. 4 is a front elevational view of a support plate for the power take-off assembly of the waste processing machine of FIG. 2.

To provide for proper dynamic alignment in operation, once the belt drive is installed and tensioned, a method, according to the present invention, is provided for aligning the clutch assembly of the waste processing machine 10. The method includes the step of providing a jacking assembly 34 such as a hydraulic jack. As illustrated in FIG. 3, the jacking assembly 34 is placed between the support frame 20 and the clutch shaft 26 of the power take-off assembly 22 along a line established by a travel of the drive belt when it is installed. The jacking assembly 34 is actuated to produce a predetermined deflection of the clutch shaft 26, the sheave housing 28, the clutch housing 24, and the clutch components attached to the power take-off assembly 22, relative to the support frame 20 and the support plate 30. In other words, this predetermined deflection is produced in a direction that is opposite to the transverse force of the belt drive assembly that will be applied once the belt drive is installed and tensioned that will be placed on the above-mentioned components and ultimately upon the clutch components attached to the power take-off assembly 22. The predetermined deflection caused by the jacking action moves these components beyond a zero alignment position to an offset or pre-load position. In the preferred embodiment of the method of the present invention, the deflection should fall in a range between approximately 0.005 inches and approximately 0.015 inches, depending upon the amount of tension that will be applied to the drive belt assembly.

Figures 5A, 5B, 5C:
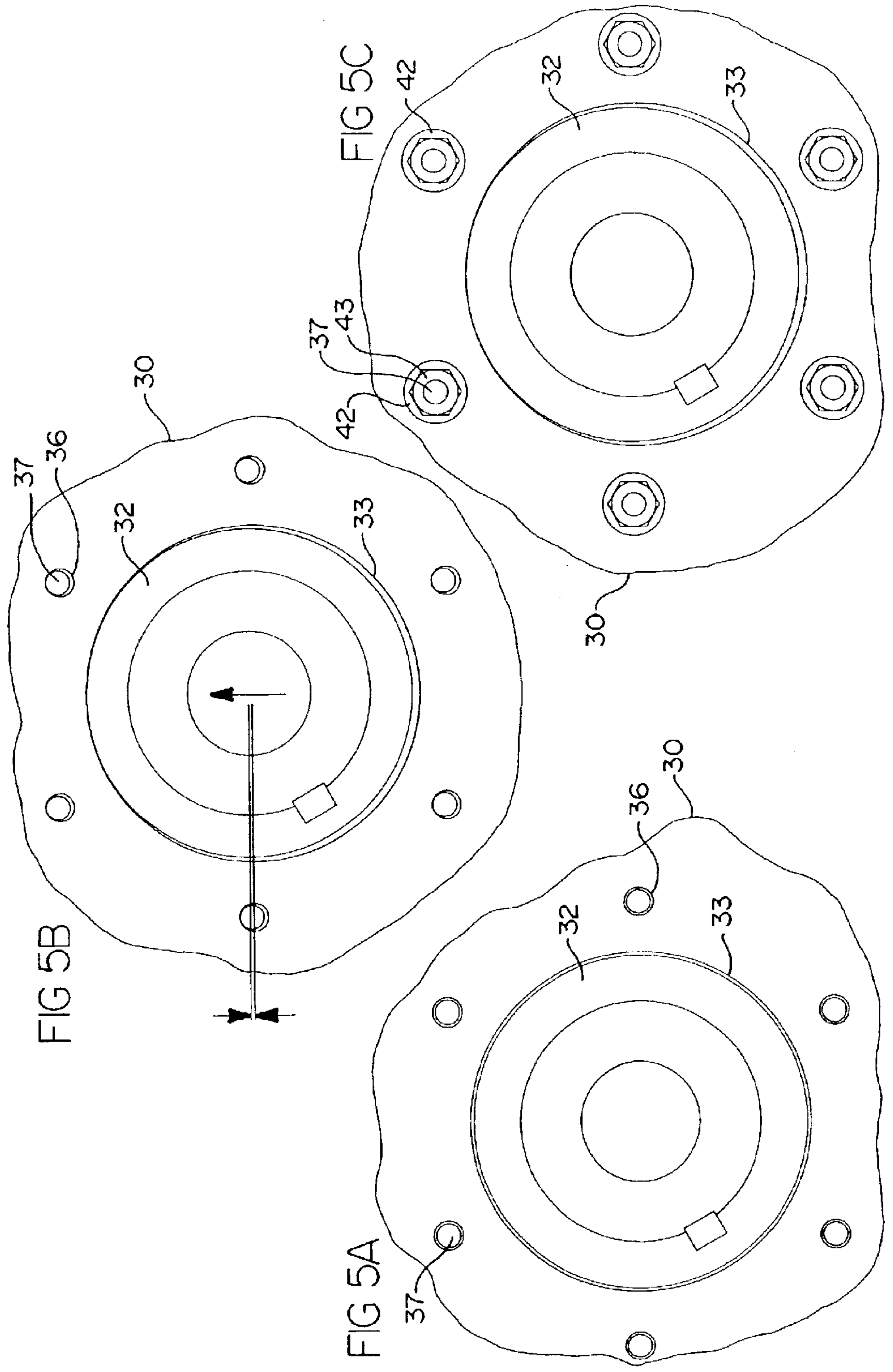
FIG. 5A is a partial front elevational view of the support plate depicting a zero deflection static alignment of a sheave housing to the support plate for the power take-off assembly of the waste processing machine of FIG. 2.
FIG. 5B is a view similar to FIG. 5A illustrating a step of a method, according to the present invention, for aligning a clutch assembly of the waste processing machine of FIG. 1.
FIG. 5C is a view similar to FIG. 5A illustrating a step of a method, according to the present invention, for aligning a clutch assembly of the waste processing machine of FIG. 1.
Figure 6B:
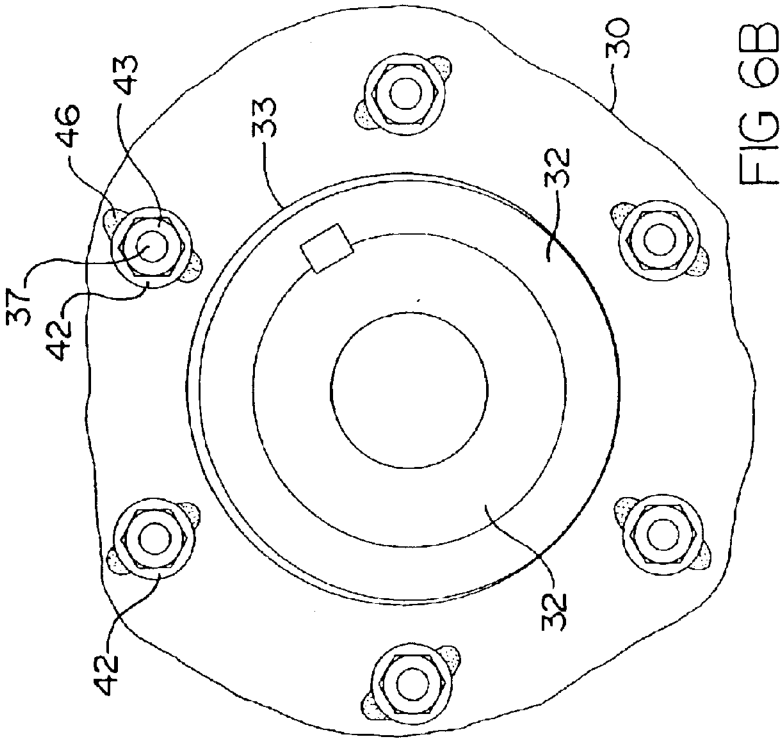
FIG. 6B is a view similar to FIG. 5A illustrating a step of a method, according to the present invention, for aligning a clutch assembly of the waste processing machine of FIG. 1.

Next, the method includes the step of attaching the support plate 30 to the end of the sheave housing 28 while the clutch shaft 26, the sheave housing 28, and the clutch housing 24 are in the deflected, or pre-loaded, state so as to maintain the deflection after removal of the jacking assembly 34. In the preferred embodiment of the method of the present invention, as illustrated in FIGS. 5A, and 5B, the mounting holes 36 of the support plate 30 that receive threaded studs or fasteners 37 of the sheave housing 28 are larger in diameter than the fasteners 37 of the sheave housing 28. Thereby, the sheave housing 28 can be deflected out of its alignment with the support plate 30 so that the pre-load can be established. FIGS. 5B, 5C, and 6B generally depict the pre-determined deflection as it appears at the sheave bearing opening 33 of the support plate 30. It should be appreciated that the support plate 30 includes mounting holes 38 that may also be larger than associated threaded studs or fasteners 40 of the support frame 20 to allow for the pre-load deflection. It should be appreciated that the mounting holes 36, 38 of the support plate 30 may be elongated or slotted.

Figure 7A:
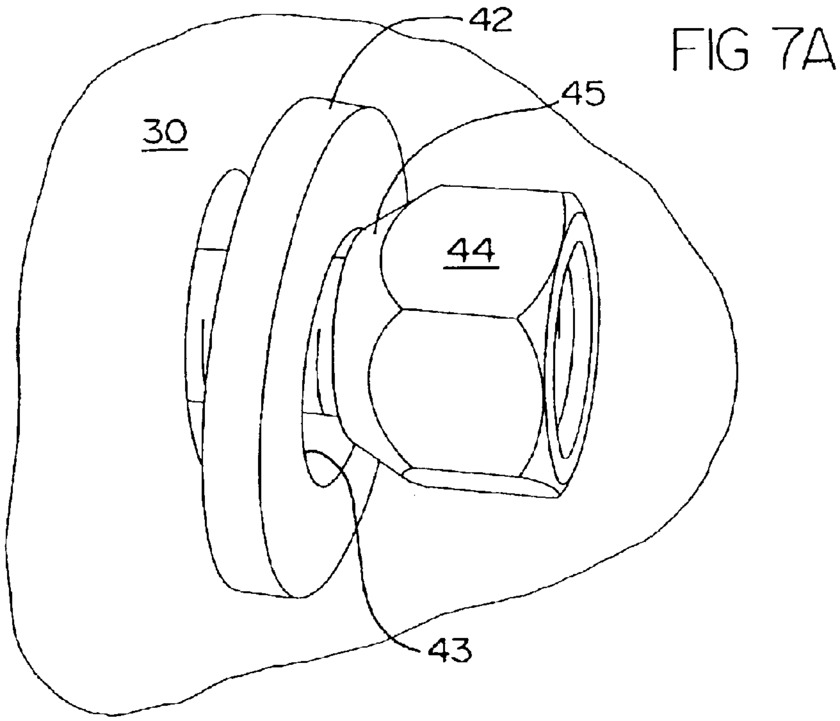
FIG. 7A is a perspective view of a step of a method, according to the present invention, for aligning a clutch assembly of the waste processing machine of FIG. 1.
Figure 7B:
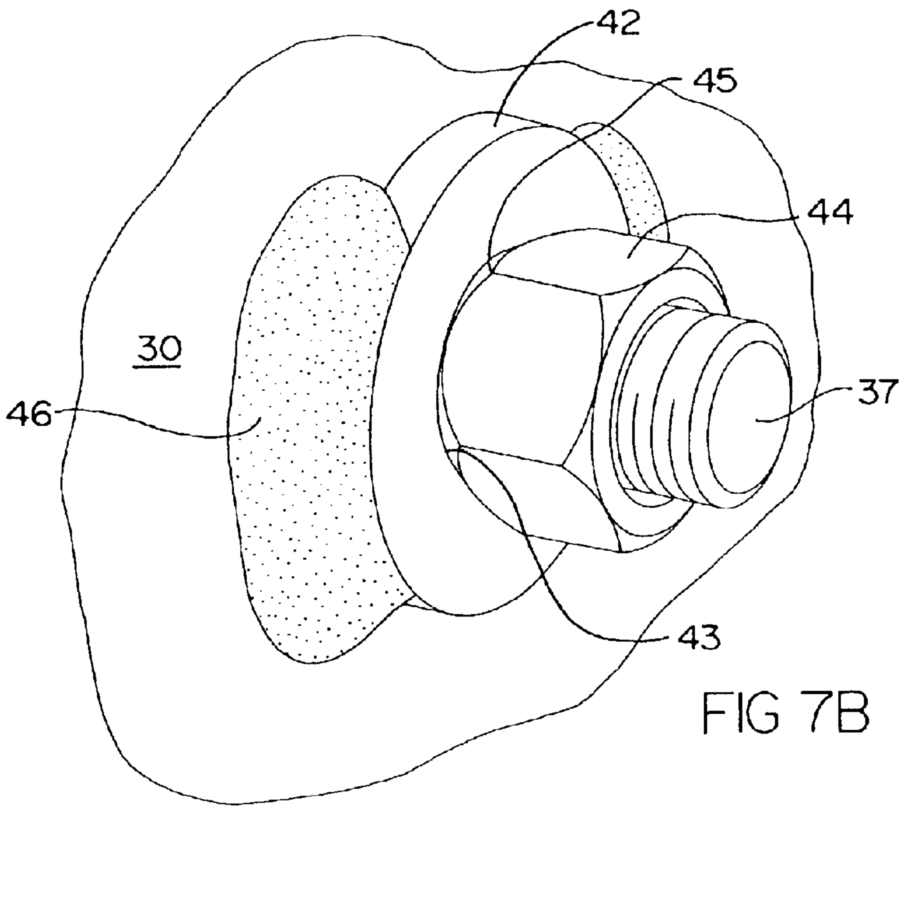
FIG. 7B is a perspective view of a step of a method, according to the present invention, for aligning a clutch assembly of the waste processing machine of FIG. 1.

The method includes the step of disposing the fasteners 37 through the mounting holes 36 of the sheave housing 28 and the fasteners 40 through the mounting holes 38 of the support frame 30. The method includes the step disposing spacers 42 such as washers over the fasteners 37 and 40 adjacent the support plate 30. The spacers 42 have an enlarged aperture 43 for a function to be described. The method also includes attaching threaded fasteners 44 such as nuts having a taper 45 to the fasteners 42 to engage the apertures 43 of the spacers 42 and prevent the fasteners 42 from exiting the mounting holes 36,38 in the support plate 30 as illustrated in FIG. 7A. The method includes the step of fixedly securing the spacers 42 to the support plate 30 by welds 46 as illustrated in FIG. 7B. It should be appreciated that the spacers 42 are welded to the support plate 30 once the deflection has been preformed to establish the offset alignment and reinforce the deflected position.

Figure 6A:
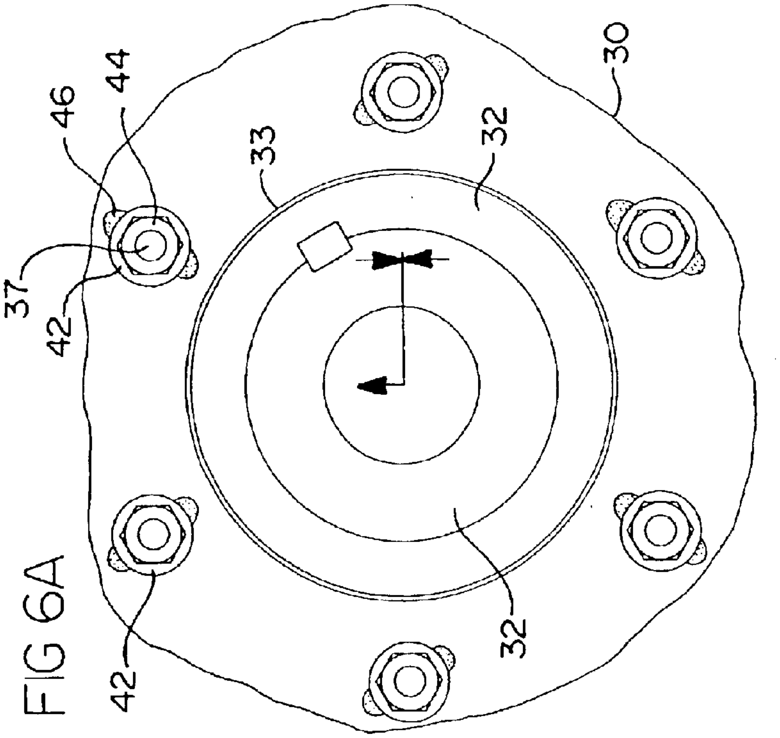
FIG. 6A is a view similar to FIG. 5A illustrating a step of a method, according to the present invention, for aligning a clutch assembly of the waste processing machine of FIG. 1.

Once the deflection has been performed and the support plate 30 is secured, the jacking assembly 34 is removed. Thus, the deflection, or preload, causes the clutch components that are attached to the power take-off assembly 22 to be statically out of alignment with the clutch components attached to the engine flywheel as illustrated in FIG. 6B. In this manner, when the drive belt assembly is installed and tensioned, the drive belt tension will cause the clutch shaft 26, the associated components, and ultimately the clutch components attached to the power take-off housing 24 to draw in the direction of the belt loading. This transverse force delivered by the drive belt tension counteracts, or negates, the pre-load deflection and draws the above-mentioned components, including the clutch components into alignment as illustrated in FIG. 6A. It should be appreciated that the taper 45 of the fasteners 44 engage the aperture 43 of the spacers 42 and are tightened to the support plate 30 and the spacers 42 are welded to the support plate 30 to maintain the alignment of the clutch shaft 26 relative to the engine 18. It should also be appreciated that, after the fasteners 44 are removed for servicing of the power take-off assembly 22, the fasteners 44 are reattached to the mounting fasteners 37 and the taper 45 of the fasteners 44 engages the aperture 43 of the spacers 42 to realign the clutch shaft 26 relative to the engine 18.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for aligning a clutch assembly, said method comprising the steps of:

providing the clutch assembly having a clutch shaft and a housing with a plurality of threaded first fasteners;

attaching the clutch assembly to a driveshaft of an engine mounted on a support frame having a plurality of second threaded fasteners;

mounting a support plate to the housing and support frame and extending the first fasteners and second fasteners through mounting holes;

deflecting the clutch shaft relative to the driveshaft;

disposing spacers over the first fasteners and second fasteners adjacent the support plate;

engaging the first fasteners and second fasteners with third fasteners to seat the spacers against the support plate;

fixedly securing the spacers to the support plate; and assembling and tensioning a drive belt assembly operatively cooperating with the clutch shaft such that the deflection created is negated and the clutch shaft is brought into alignment with the driveshaft of the engine.

2. A method as set forth in claim 1 including the steps of providing enlarged mounting holes in the support plate.

3. A method as set forth in claim 1 including the step of providing an aperture in the spacers.

4. A method as set forth in claim 3 including the step of providing a taper on the third fasteners.

5. A method as set forth in claim 4 including the step of engaging the taper with the aperture.

6. A method as set forth in claim 1 wherein said step of fixedly securing comprises welding the spacers to the support plate.

7. A method as set forth in claim 1 wherein said step of deflecting comprises placing a jacking assembly between the support frame and the clutch shaft along a drive belt line of travel.

8. A method as set forth in claim 7 wherein said step of deflecting further comprises actuating the jacking assembly to produce a predetermined deflection of the clutch shaft.

9. A method as set forth in claim 8 including the step of removing the jacking assembly after said step of fixedly securing.

10. A method as set forth in claim 1 wherein said step of deflecting comprises deflecting the clutch shaft in a range between approximately 0.005 inches and approximately 0.015 inches.

11. A method for aligning a clutch assembly of a power take-off assembly relative to an engine mounted on a support frame, said method comprising the steps of:

providing the clutch assembly having a clutch shaft and a housing with a plurality of threaded first fasteners;

attaching the clutch assembly to a driveshaft of the engine;

providing a jacking assembly;

placing the jacking assembly between the support frame and a clutch shaft of the power take-off assembly along a drive belt line of travel;

actuating the jacking assembly to produce a predetermined deflection of the clutch shaft in a direction opposite to that of a drive belt line of travel relative to the support frame;

providing a support plate having mounting apertures;

mounting the support plate to the housing and support frame and extending the first fasteners through the mounting holes;

providing a plurality of spacers and disposing the spacers over the first fasteners adjacent the support plate;

providing a plurality of threaded second fasteners and engaging the first fasteners with the second fasteners;

removing the jacking assembly;

assembling and tensioning a drive belt assembly operatively cooperating with the clutch shaft such that the deflection created by the jacking assembly is negated and the clutch shaft is brought into alignment with the driveshaft of the engine.

12. A method as set forth in claim 11 including the steps of providing enlarged mounting holes in the support plate.

13. A method as set forth in claim 11 including the step of providing an aperture in the spacers.

14. A method as set forth in claim 13 including the step of providing a taper on the second fasteners.

15. A method as set forth in claim 14 including the step of engaging the taper with the aperture.

16. A method as set forth in claim 11 wherein said step of fixedly securing comprises welding the spacers to the support plate.

17. A method as set forth in claim 11 wherein said step of deflecting comprises placing a jacking assembly between the support frame and the clutch shaft along the drive belt line of travel.

18. A method as set forth in claim 17 wherein said step of deflecting further comprises actuating the jacking assembly to produce a predetermined deflection of the clutch shaft.

19. A method as set forth in claim 11 wherein said step of deflecting comprises deflecting the clutch shaft in a range between approximately 0.005 inches and approximately 0.015 inches.

20. A method for aligning a clutch assembly of a power take-off assembly with a prime mover mounted to a support frame, said method comprising the steps of:

providing a clutch assembly having a clutch shaft and a housing with a plurality of threaded first fasteners;

attaching the clutch assembly to a driveshaft of an engine mounted on a support frame having a plurality of second threaded fasteners;

providing a support plate having mounting apertures;

providing a jacking assembly;

placing the jacking assembly between the support frame and the clutch shaft;

actuating the jacking assembly to produce a predetermined deflection of the clutch shaft in a direction opposite to that of a drive belt tension when a drive belt is installed about a sheave attached to the clutch shaft;

attaching the support plate to the housing of the power take-off assembly while in its deflected state so as to maintain the deflection after removal of the jacking assembly;

providing a plurality of spacers and disposing the spacers over the first fasteners and second fasteners adjacent the support plate;

providing a plurality of threaded third fasteners and engaging the first fasteners and second fasteners with the third fasteners to seat the spacers against the support plate;

fixedly securing the spacers to the support plate;

removing the jacking assembly; and assembling and tensioning a drive belt assembly operatively cooperating with the clutch shaft such that the deflection created by the jacking assembly is negated and the clutch shaft is brought into alignment with the driveshaft of the engine.

* * * * *